US012695241B2

(12) United States Patent
Mahon et al.

(10) Patent No.: US 12,695,241 B2
(45) Date of Patent: Jul. 28, 2026

(54) WAVEGUIDE WINDOW/SEAL

(71) Applicant: Optim Microwave Inc., Camarillo, CA (US)

(72) Inventors: John Mahon, Westlake Village, CA (US); Thomas Bohner, Westlake Village, CA (US)

(73) Assignee: Optim Microwave Inc., Camarillo, CA (US)

( * ) Notice: Subject to any disclaimer, the term of this patent is extended or adjusted under 35 U.S.C. 154(b) by 0 days.

(21) Appl. No.: 18/413,905

(22) Filed: Jan. 16, 2024

(65) Prior Publication Data

US 2024/0154356 A1 May 9, 2024

Related U.S. Application Data

(63) Continuation of application No. 17/162,067, filed on Jan. 29, 2021, now Pat. No. 11,876,322, which is a continuation of application No. 16/673,633, filed on Nov. 4, 2019, now Pat. No. 10,938,153.

(60) Provisional application No. 62/756,431, filed on Nov. 6, 2018.

(51) Int. Cl.
| | |
|---|---|
| *H01R 13/625* | (2006.01) |
| *H01Q 1/24* | (2006.01) |
| *H01Q 15/16* | (2006.01) |
| *H01R 13/18* | (2006.01) |
| *H04B 7/185* | (2006.01) |

(52) U.S. Cl.
CPC ............. *H01R 13/625* (2013.01); *H01Q 1/24* (2013.01); *H01Q 15/165* (2013.01); *H01R 13/18* (2013.01); *H04B 7/18517* (2013.01)

(58) Field of Classification Search
CPC .. H01R 13/625; H01R 13/18; H01R 2201/02; H01Q 1/24; H01Q 15/165; H01Q 19/136; H04B 7/18517; H01P 1/042
See application file for complete search history.

(56) References Cited

U.S. PATENT DOCUMENTS

| | | | | | |
|---|---|---|---|---|---|
| 3,593,224 | A | * | 7/1971 | Eggers | H01J 23/36 333/252 |
| 4,022,518 | A | | 5/1977 | Gattaz | |
| 4,173,744 | A | * | 11/1979 | Faillon | H01J 23/36 315/39.53 |
| 4,326,769 | A | * | 4/1982 | Dorsey | H01R 24/40 439/21 |
| 4,965,541 | A | * | 10/1990 | Okazaki | H01P 1/08 315/5 |
| 5,043,629 | A | * | 8/1991 | Doane | H01P 1/08 333/252 |

(Continued)

FOREIGN PATENT DOCUMENTS

| | | | | |
|---|---|---|---|---|
| JP | | 2019186223 A | * | 10/2019 |

*Primary Examiner* — Dimary S Lopez Cruz
*Assistant Examiner* — Bamidele A Immanuel
(74) *Attorney, Agent, or Firm* — SoCal IP Law Group LLP; Mark Andrew Goldstein; John E. Gunther

(57) ABSTRACT

A window/seal and a satellite ground station antenna using the window/seal. A window/seal for a circular waveguide includes a right-circular cylindrical window having an axis, an annular rib surrounding and coaxial with the annular recess, and an annular recess between the cylindrical window and the annular rib. An outer diameter of the annular rib is configured to fit closely within an inside diameter of the circular waveguide.

10 Claims, 7 Drawing Sheets

(56)                References Cited

U.S. PATENT DOCUMENTS

| 5,107,274 | A | * | 4/1992 | Mitchell ................. H01P 1/165 |
| | | | | 343/756 |
| 5,668,513 | A | * | 9/1997 | Umezu .................... H01P 1/08 |
| | | | | 333/252 |
| 5,700,160 | A | | 12/1997 | Lee |
| 6,088,502 | A | * | 7/2000 | Faist .................... G02B 6/3849 |
| | | | | 385/94 |
| 6,162,082 | A | | 12/2000 | Karsten et al. |
| 6,379,183 | B1 | | 4/2002 | Ayres et al. |
| 6,402,549 | B1 | * | 6/2002 | Ayres ................... H01R 9/0515 |
| | | | | 439/578 |
| 6,540,408 | B1 | * | 4/2003 | Jinnai .................... H01P 1/042 |
| | | | | 385/55 |
| 7,144,271 | B1 | * | 12/2006 | Burris ................ H01R 13/5219 |
| | | | | 439/578 |
| 7,601,027 | B2 | * | 10/2009 | Rosenberger ......... H01R 13/14 |
| | | | | 439/578 |
| 7,942,699 | B1 | | 5/2011 | Rossman et al. |
| 8,864,389 | B2 | * | 10/2014 | Lin .......................... G02B 6/38 |
| | | | | 385/60 |
| 9,362,629 | B2 | | 6/2016 | Hinman et al. |
| 9,863,567 | B2 | * | 1/2018 | Lehmann ............. F16L 37/107 |
| 2004/0014363 | A1 | * | 1/2004 | Khemakhem .......... H01R 24/44 |
| | | | | 439/620.04 |
| 2005/0007288 | A1 | | 1/2005 | Tuau et al. |
| 2005/0153591 | A1 | | 7/2005 | Milner et al. |
| 2008/0254668 | A1 | | 10/2008 | Rosenberger |
| 2009/0027290 | A1 | | 1/2009 | Hatazawa |
| 2009/0029585 | A1 | | 1/2009 | Shen et al. |
| 2009/0243955 | A1 | | 10/2009 | Legare et al. |
| 2011/0156844 | A1 | * | 6/2011 | Wakabayashi ........... H01P 3/12 |
| | | | | 333/254 |
| 2012/0194303 | A1 | * | 8/2012 | Pettus .................... H01P 5/107 |
| | | | | 29/601 |
| 2012/0196468 | A1 | | 8/2012 | Katatsuji et al. |
| 2012/0229232 | A1 | | 9/2012 | Mahon et al. |
| 2013/0115784 | A1 | * | 5/2013 | Gobel ................. H01R 24/542 |
| | | | | 439/13 |
| 2013/0244467 | A1 | | 9/2013 | Tran et al. |
| 2013/0335215 | A1 | | 12/2013 | Li |
| 2013/0341914 | A1 | | 12/2013 | Lehmann et al. |
| 2014/0044394 | A1 | | 2/2014 | Lin |
| 2014/0065872 | A1 | | 3/2014 | Yamada |
| 2014/0247191 | A1 | | 9/2014 | Mahon |
| 2014/0273541 | A1 | | 9/2014 | Renaud et al. |
| 2014/0273608 | A1 | | 9/2014 | Whetstone et al. |
| 2015/0180183 | A1 | * | 6/2015 | Watkins ............. H01R 13/6581 |
| | | | | 439/578 |
| 2015/0303580 | A1 | * | 10/2015 | Wright ................... H01Q 13/02 |
| | | | | 29/600 |
| 2016/0013534 | A1 | * | 1/2016 | Pettus .................... H01P 5/107 |
| | | | | 164/111 |
| 2016/0018603 | A1 | | 1/2016 | Mooij et al. |
| 2016/0126638 | A1 | | 5/2016 | Brandau |
| 2016/0218408 | A1 | * | 7/2016 | Saito ....................... H01P 1/042 |
| 2017/0227719 | A1 | | 8/2017 | Zimmel et al. |
| 2017/0338592 | A1 | * | 11/2017 | Doi ....................... H01R 13/18 |
| 2018/0076501 | A1 | | 3/2018 | Matsumoto et al. |
| 2018/0323534 | A1 | | 11/2018 | Patton et al. |
| 2020/0044344 | A1 | | 2/2020 | Rogers |
| 2020/0395718 | A1 | * | 12/2020 | Chih ................... H01R 13/665 |
| 2022/0094066 | A1 | | 3/2022 | Lebayon |

* cited by examiner

SECTION A-A (c) Optim Microwave 2024

SECTION C-C

WAVEGUIDE WINDOW/SEAL

RELATED APPLICATION INFORMATION

This patent is a continuation of application Ser. No. 17/162,067, filed Jan. 20, 2021, entitled WAVEGUIDE QUICK-CONNECT MECHANISM, WAVEGUIDE WINDOW/SEAL, AND PORTABLE ANTENNA, now U.S. Pat. No. 11,876,322, which is a continuation of application Ser. No. 16/673,633, filed Nov. 4, 2019, entitled WAVEGUIDE QUICK-CONNECT MECHANISM, WAVEGUIDE WINDOW/SEAL, AND PORTABLE ANTENNA, now U.S. Pat. No. 10,938,153, which claims priority from U.S. provisional patent application No. 62/756,431 entitled "WAVEGUIDE QUICK-CONNECT MECHANISM AND PORTABLE ANTENNA" filed Nov. 6, 2018, the entirety of which are incorporated by reference.

NOTICE OF COPYRIGHTS AND TRADE DRESS

BACKGROUND

Field

This disclosure relates to antennas for satellite communications earth stations.

Description of the Related Art

Satellite communications systems use one or more orbiting satellites to relay communications between a pair of earth stations. Each earth station typically consists of a transmitter and a receiver coupled to a highly directional antenna. Given the large distance between each earth station and the satellite, each earth station must be configured to transmit a relatively powerful signal and to receive a very low power signal. A common form of antenna for transmitting to and receiving from a satellite consists of a parabolic dish primary reflector and a feed network.

Satellite communications systems commonly use separate frequency bands for the uplink to and downlink from satellites. Additionally, one or both of the uplink and downlink may transmit orthogonal right-hand and left-hand circularly polarized signals or orthogonal linearly polarized signals within the respective frequency band.

In many applications, such as disaster relief, it is desirable to set up an earth station in a remote and often inhospitable location. Such applications require an antenna that can be disassembled and compactly packaged, for example in a carrying case or backpack, for easy transport and then quickly and precisely reassembled.

In this patent, the term "circular waveguide" means a waveguide segment having a circular cross-sectional shape. Similarly, the term "annular waveguide" means a waveguide segment having a cross-sectional shape of an annulus between two concentric circles. The term "waveguide component" means a physical element containing at least one waveguide. The term "port" refers generally to an interface between waveguide components or between a waveguide component and free space. A port of a waveguide component may be formed by an aperture in an interfacial surface to allow microwave radiation to enter or exit a waveguide within the waveguide component. In this patent, the term "waveguide circuit" means an assembly of two or more waveguide components coupled such that microwave radiation can transit between waveguides within the waveguide components.

DESCRIPTION OF THE DRAWINGS

Elements in the drawings are assigned two- or three-digit reference numbers. An element not described in conjunction with a figure may be presumed to be the same as a previously-described element having the same reference number.

DETAILED DESCRIPTION

Description of Apparatus

Figure 1:
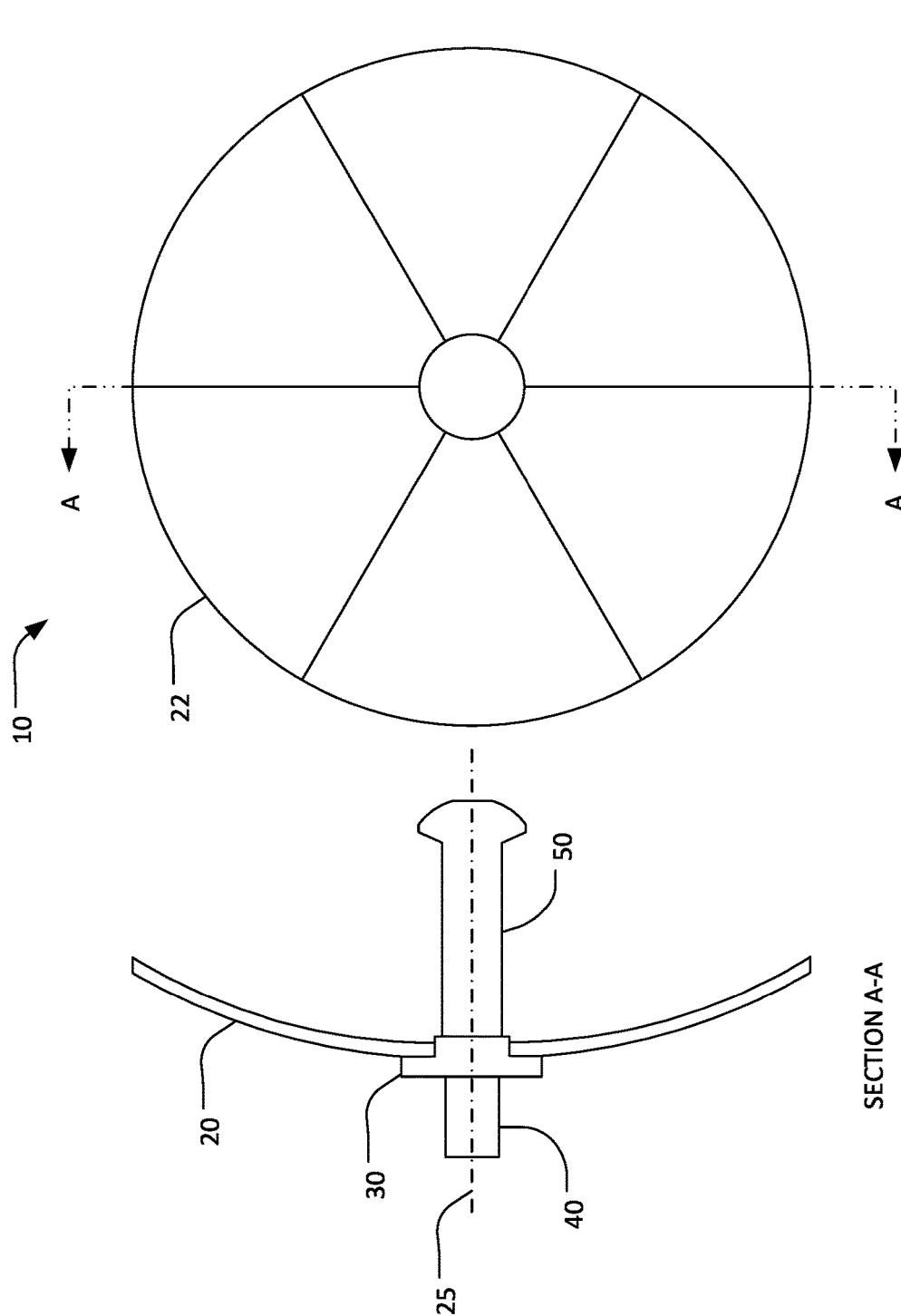
FIG. 1 is a front view and simplified cross-sectional schematic view of a portable earth station antenna.

FIG. 1 includes a schematic front view and a greatly simplified schematic cross-sectional view of a portable earth station antenna 10 which includes a primary reflector 20, a hub 30, a back-side feed network 40, and a front-side feed network 50. In this patent, the "front" side of the antenna is the side that faces the satellite, which is to say the concave side of the primary reflector. The "back" side of the antenna is the convex side of the primary reflector. The hub 30 and/or the back-side feed network 40 may have provisions (not shown) to attach the antenna to a base or mount that allows the antenna to be aimed at a particular satellite.

To facilitate transporting the portable earth station antenna 10, the primary reflector 20 may consist of a plurality of segments or petals, such as the petal 22, that collectively form a parabolic reflector when attached to the hub 30. When detached from the hub 30, the petals may be nested and compactly packaged for transport.

The portable earth station antenna 10 is a center-fed antenna with the feed network located along the axis 25 of the primary reflector 20. The back-side feed network 40 and the front-side feed network are coupled by a waveguide (not shown) that passes through the hub 30 along the axis 25. This waveguide may be, for example a circular waveguide, an annular waveguide, or coaxial circular and annular waveguides.

The back-side feed network 40 includes components to couple the antenna to a transmitter and a receiver of the satellite earth station (not shown). The back-side feed network 40 may include, for example, a diplexer to separate signals in different uplink and downlink frequency bands and/or one or more orthomode transducers to separate orthogonally polarized signals. The internal configurations of the back-side and front-side feed networks 40, 50 will depend on the communications frequency band and protocols employed by the satellite with which the earth station will communicate.

The front-side feed network 50 includes a secondary reflector (not visible but housed in the "mushroom cap" at the end of the front side feed network) and a waveguide circuit along the axis 25, which couples the secondary reflector to the back-side feed network 40. Uplink signals from the earth station transmitter are coupled into the waveguide circuit by the back-side feed network 40. The uplink signals travel through the waveguide circuit along the axis 25 to the secondary reflector, where the uplink signals are reflected towards the primary reflector 20, which forms the uplink signals into a narrow beam aimed towards the satellite. Downlink signals from the satellite travel a reverse path to the earth station receiver.

When the uplink to and the downlink from the satellite use circularly polarized signals, the front-side feed network 50 may include a polarizing element that converts linearly polarized signals into circularly polarized signals. Specifically, the polarizing element will convert a signal with a first linear polarization direction into a right-hand circularly polarized signal and convert a second signal with a second linear polarization direction orthogonal to the first polarization direction into a left-hand circularly polarized signal. This conversion can be reversed, such that the first signal is converted to left-hand circular polarization and the second signal in converted to right-hand circular polarization, by rotating the front-side feed network 50 90 degrees about the antenna axis 25. Since the polarization direction may have to be set or changed when a portable antenna is in the field, it is desirable for the front-side feed network 50 to be attachable to the hub 30 in two (or four) positions rotated by substantially 90 degrees about the antenna axis 25.

Figure 2:
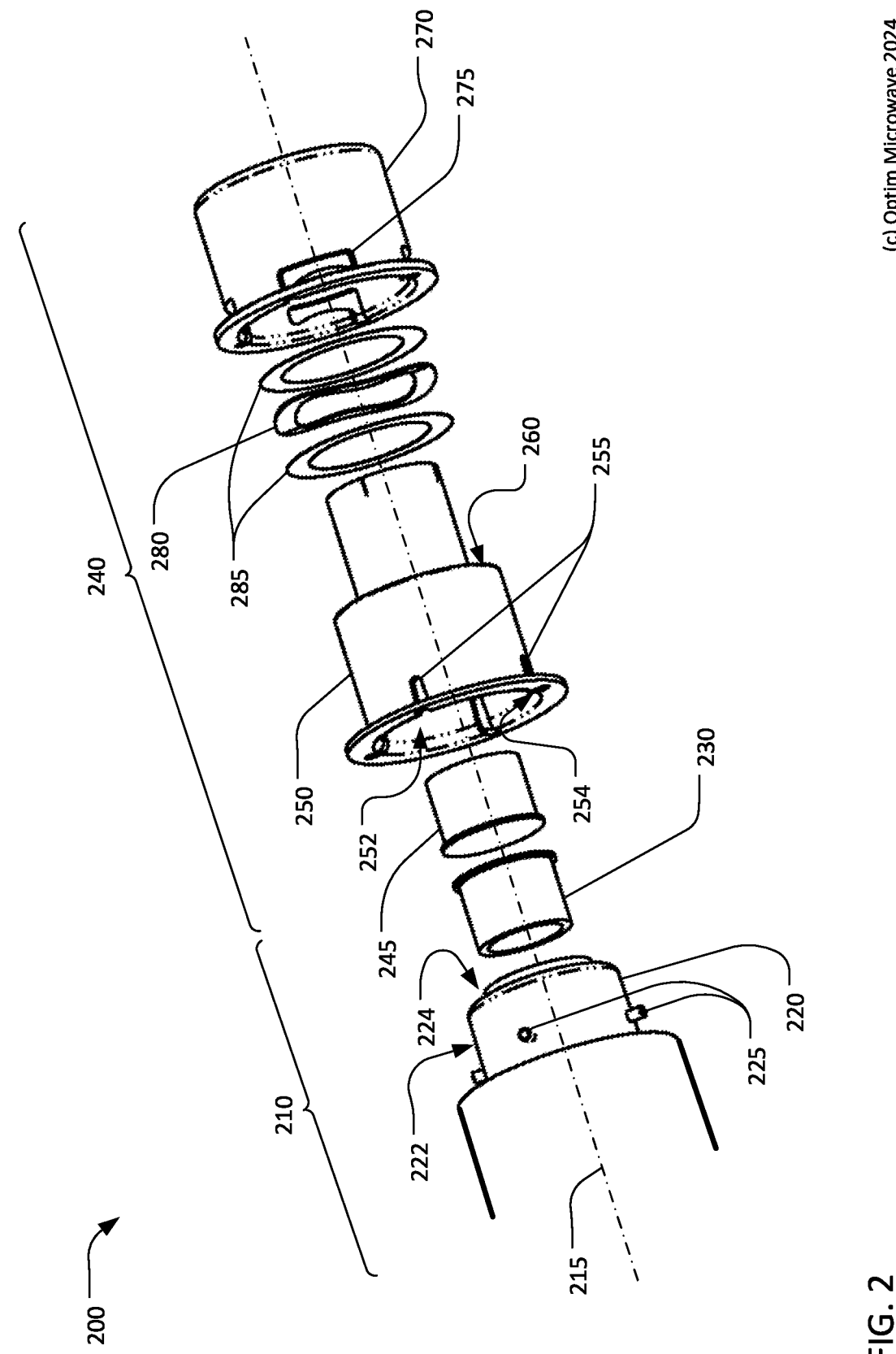
FIG. 2 is an exploded perspective view of a waveguide circuit including a quick-connect mechanism between two waveguide components.

FIG. 2 is an exploded perspective view of portions of a waveguide circuit 200 including a first waveguide component 210 and a second waveguide component 240. The first waveguide component 210 include a first circular waveguide (not visible) concentric with an axis 215. The first waveguide component 210 includes a first connecting member 220. A body 222 of the first connecting member 220 may be shaped as a right circular cylinder or a frustum of a right circular cone. In either case, the body 222 is concentric with the first circular waveguide. The first circular waveguide terminates at a first port (not visible) in an end face 224 of the first connecting member 220. Two or more pins 225 extend radially from the body 222 of the first connecting member 220. The first waveguide component 210 may include a first waveguide window 230. The first waveguide window 230 is inserted into the port of the circular waveguide to seal the port and prevent intrusion of moisture and foreign objects into the first waveguide when the waveguide circuit 200 is disassembled.

The second waveguide component 240 includes a second circular waveguide concentric with the axis 215 and a second connecting member 250 having a cavity 252 configured to fit over the first connecting member 220 of the first waveguide component 210. An inside surface 254 of the cavity 252 may be a right circular cylinder or a frustum of a right circular cone. In either case, the cavity 252 is concentric with the second circular waveguide. The second circular waveguide terminates at a second port (not visible) within the cavity 252. The second connecting member 250 includes slots 255 that accept the pins 225 when the second connecting member 250 is engaged with the first connecting member 220. When the connecting member 250 is engaged with the first connecting member 220, the first and second ports are brought into contact or close proximity such that the first and second waveguides are connected. The second waveguide component 240 may include a second waveguide window 245 inserted into the second port to seal the port and prevent intrusion of moisture and foreign objects into the second waveguide when the waveguide circuit 200 is disassembled. The first waveguide window 230 and the second waveguide window 245, in combination, are substantially transparent to microwave radiation.

To hold the first and second waveguide components 210, 240 in the engaged position, a cup-shaped cap 270 may fit over the second connecting portion 250. A wave spring 280 is compressed between an inside surface of the cap 270 and a shoulder 260 of the second connecting portion 250. The cap 270 includes L-shaped slots 275 that allow the cap 270 to slide over the pins 225 and then rotate. The L-shaped slots 275 may include detents that allow the cap 270 to move slightly away from the first waveguide component 210 when the cap is in its fully rotated position. The cap 270 is considered to be "engaged" with the pins 225 when the pins 225 are disposed in the detents. Pressure from the spring 280 forces the second waveguide component 240 against the first waveguide component and retains the cap 270 in the fully rotated position. The spring 280 may be, for example, a hard steel spring material. When one or both of the second waveguide component 240 and the cap 270 are formed from a softer material, such as an aluminum alloy, flat washers 285 may be placed on one or both sides of the spring 280 to prevent the spring from marring the inside of the cap 270 or the shoulder 260.

To connect the first and second waveguide components 210, 240, the components must be rotated with respect to each other about the axis 215 such that the slots 255 align with the pins 225. The number of possible orientations of the first and second waveguide components 210, 240 is determined by the number and arrangement of the pins and slots. To ensure uniform pressure on the shoulder 260 of the second waveguide component 240, at least two pins 225 are required, and three or more pins may be preferred. In the example of FIG. 2, four pins 225 (one of which cannot be seen) are disposed at 90-degree intervals about a circumference of the first connecting member 220, and four corresponding slots 255 are provided in the second connecting member 260. The use of four pins and four slots allows the first and second waveguide components to be connected with four different relative positions, rotated by 90 degrees. Other configurations of pins and slots may be used. For example, three or more pins and a corresponding number of slots disposed at unequal angles about a perimeter of the first connecting member can be used to restrict the first and second waveguide component to be connected in exactly one orientation.

Figure 3:
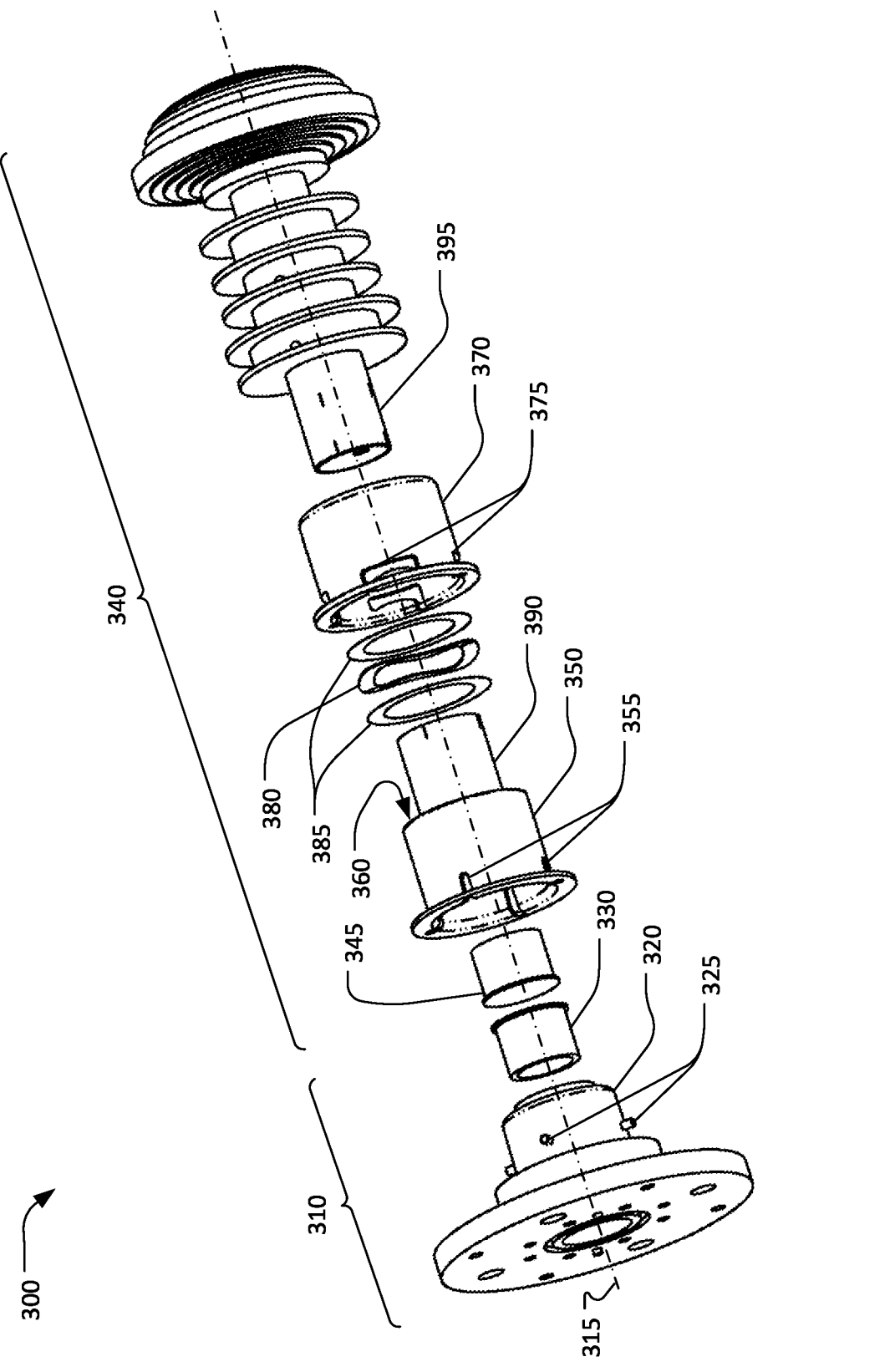
FIG. 3 is an exploded perspective view of a portion of an earth station antenna including an antenna hub and parts of a feed network.
Figure 4:
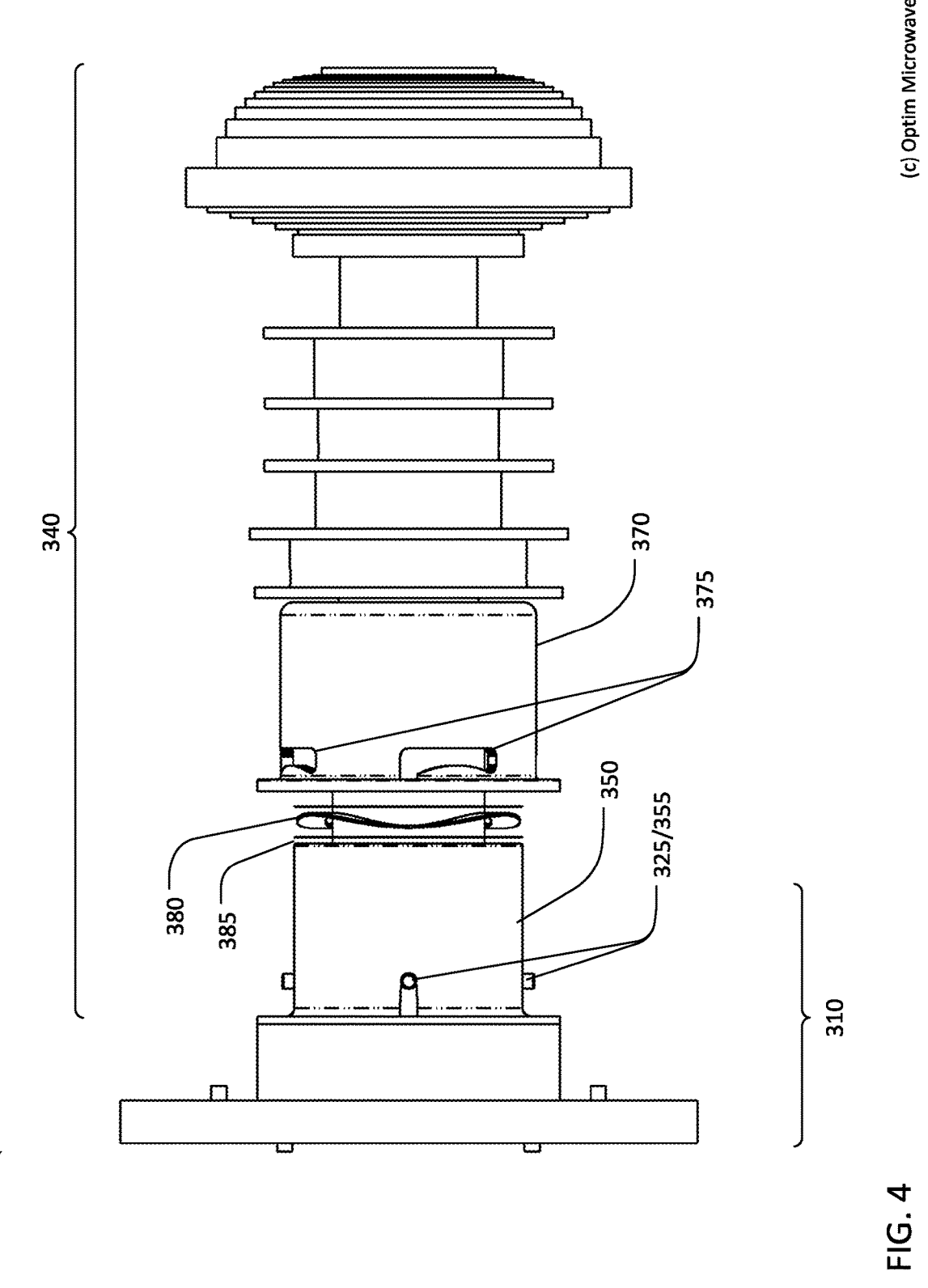
FIG. 4 is a side view of the hub and partial feed network of the antenna of FIG. 3.
Figure 5:
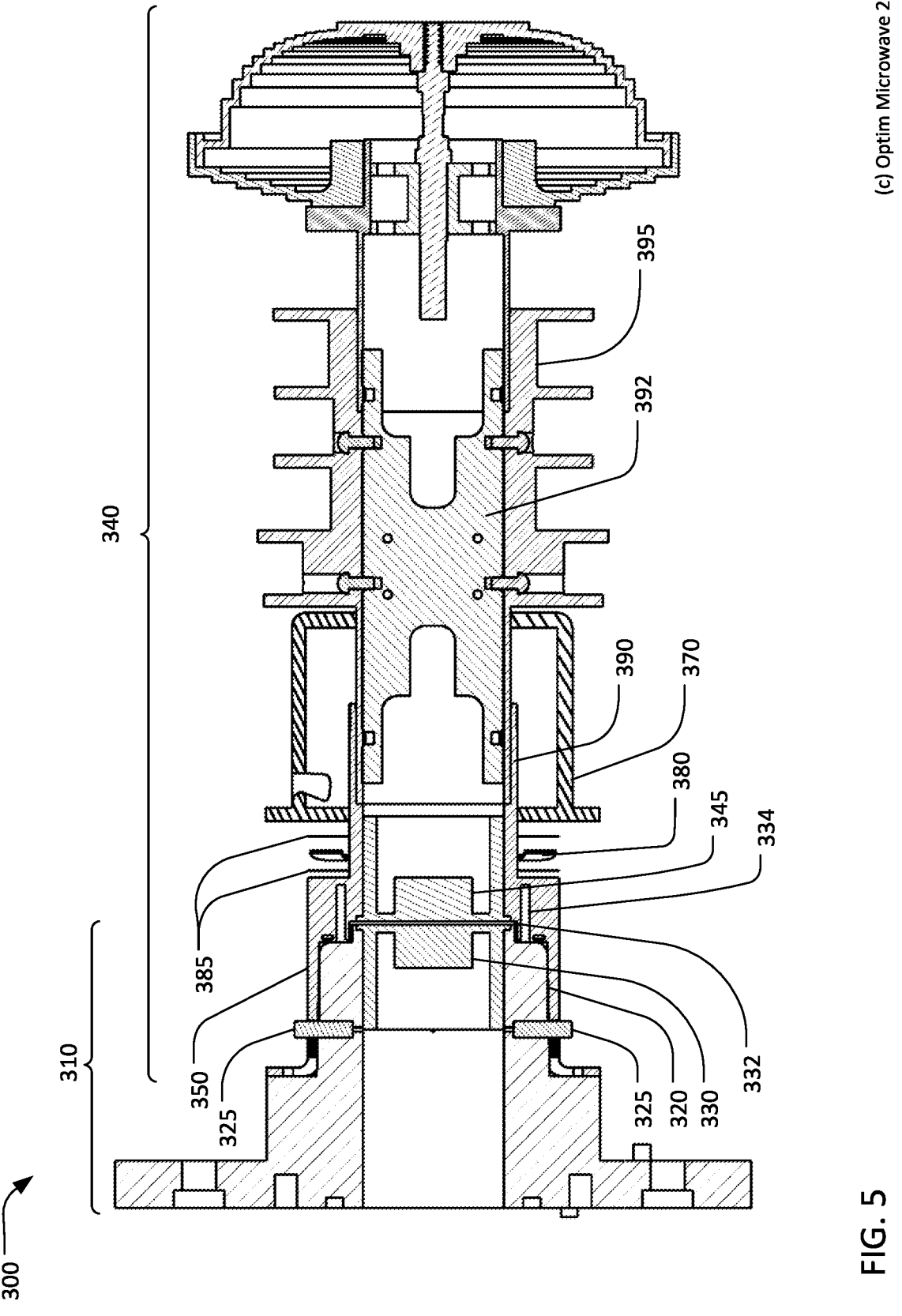
FIG. 5 is a cross-sectional view of the hub and partial feed network of the antenna of FIG. 3 and FIG. 4.

FIG. 3 is an exploded perspective view of a portion of a portable ground station antenna 300 including portions of a hub 310 and a front-side feed network 340 that are connectable by the quick-connect mechanism previously shown in greater detail in FIG. 2. A circular waveguide, centered on an antenna axis 315, extends through the hub 310 into the front-side feed network 340. FIG. 4 is a side view of the same portions of the ground station antenna with the front-side feed network 340 mated with the hub 310 before the cap 370 is engaged with the pins 325. FIG. 5 is a cross-sectional view of the assembly of FIG. 4 through the antenna axis.

Unless otherwise noted, each of the elements described subsequently can be seen in two or three of these figures.

The hub 310 includes a first connecting member 320, pins 325, and a waveguide window 330. The form and function of these elements is the same as the corresponding elements of FIG. 2.

The front-side feed network 340 is similar to the compact feed network described in U.S. Pat. No. 9,246,233. The front-side feed network 340 is made up of two waveguide components 390 and 395 that connect through a central aperture of the cap 370. The waveguide component 390 includes a second connecting member 350 with slots 355 and a shoulder 360 configured to fit over the first connecting member 320 of the hub 310. The front-side feed network 340 also includes a cap 370 with slots 375, a spring 380, and optional washers 385. The form and function of these elements is the same as the corresponding elements of FIG. 2.

The use of four pins 325 and four slots 355/375 allows the front-side feed network 340 to be connected to the hub 310 in four different relative positions, rotated by 90 degrees about the antenna axis 315. The front-side feed network 340 may contain a polarizing element 392 (shown only in cross-sectional view of FIG. 5) to convert linear polarization into circular polarization. Rotating the front-side feed network 340 about the antenna axis 315 by 90 degrees reverses the circular polarization direction for a given linear polarization. For example, a linearly polarized wavefront from the transmitter of the ground station can be converted to right-hand circular polarization with the front-side feed network in a first position and converted to left-hand circular polarization with the front-side feed network in a second position rotated 90 degrees about the antenna axis 315.

When a portable microwave system, such as the portable ground station antenna 10 of FIG. 1, is disassembled into components (such as the hub 310 and front-side feed network 340) for transport, it is preferable to have seals at each exposed waveguide port to prevent intrusion of foreign materials. Such seals must also be microwave windows, which is to say the seal must transmit microwave radiation with minimal insertion loss and no objectionable resonances. Resonances can occur due to reflections of microwave energy from the surfaces of the seals.

A known technique for sealing waveguide ports is to use a thin dielectric window. Since the reflections from two sides of a dielectric window differ in phase by 180-degrees, the reflections will cancel, or nearly cancel, if the window is sufficiently thin. However, a thin window may be subject to mechanical damage during handling and transport.

As an alternative to a fragile thin window, a window may have an electrical thickness of ½ wavelength at a selected frequency, which may be typically be a center frequency of a frequency band, or a frequency at the mid-point between uplink and downlink frequency bands. In this case reflections of microwave energy from the two sides of the window differ in phase by 540 degrees, and still substantially cancel over a useful frequency range about the selected frequency.

Figure 6:
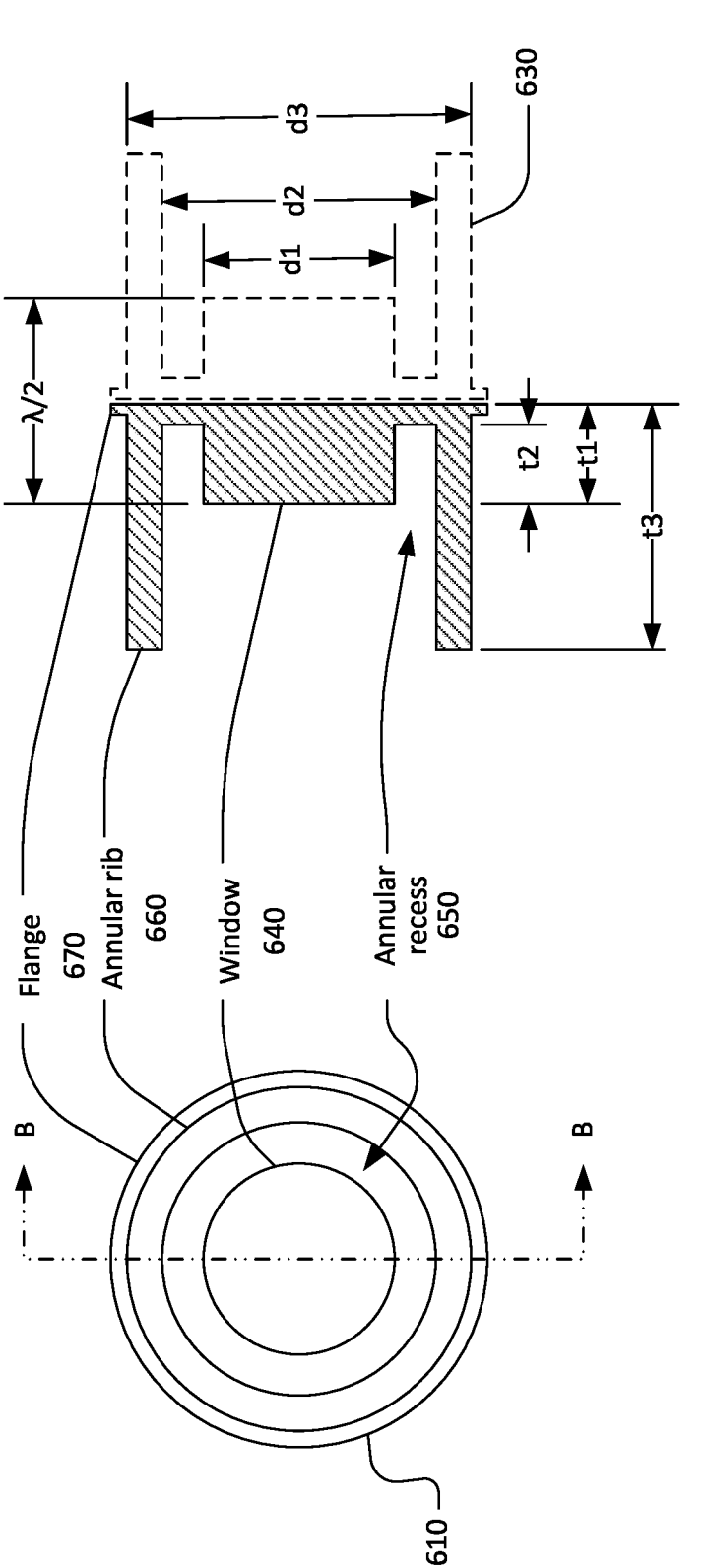
FIG. 6 is a plan view and cross-sectional view of a waveguide window.

FIG. 6 shows a plan view and a cross-sectional view of a mechanically robust waveguide window/seal 610. The waveguide window/seal 610 may be, for example, any of the waveguide windows 230 or 245 of FIG. 2 or the waveguide windows 330, 345 of FIG. 3, FIG. 4, and FIG. 5.

The waveguide window/seal 610 includes a central window 640, an annular recess 650 surrounding the window 640, and an annular rib 660 surrounding the annular recess 650. Dimension t1 is a thickness of the central window 640, t2 is a depth of the annular recess 650, and t3 is a thickness of the annular rib 660, where t2<t1<t3. An outside diameter d3 of the annular rib 660 may be configured to closely fit within an inside diameter of a circular waveguide to be sealed. The waveguide window seal 610 may optionally include a flange 670 to locate the waveguide window with respect to the waveguide. The central window 640, the annular recess 650, the annular rib 660, and the flange 670 (when present) are concentric with each other and the circular waveguide. The waveguide window seal 610 may typically be affixed in the waveguide using an adhesive.

A waveguide window/seal may commonly face and be closely proximate to another, possibly identical, waveguide window seal (as indicated by the dashed outline 630). For example, in the portable earth station antenna 300 of FIGS. 3, 4, and 5, the waveguide windows 330, 345 face each other when the front-side feed network 340 is connected to the hub 310. The waveguide windows 330, 345 may not touch, but may be separated by a gap (332 in FIG. 5). This gap forms a radial waveguide which is terminated in a conductive O-ring and coupled to one or more choke grooves (334 in FIG. 5). In such applications the total electrical thickness of the facing windows may be ½ wavelength at a selected frequency. Conveniently, the thickness t1 of the window 640 and the facing window may each be about ¼ wavelength. In some applications a waveguide window seal may face air (i.e. open space or an unsealed waveguide) rather than another window seal. In this case, the thickness t1 of the window 640 may be ½ wavelength.

The presence of a thick dielectric window in a waveguide presents a substantial change in impedance from the impedance of the empty waveguide. Additionally, the presence of a thick dielectric window may cause higher order mode (e.g. TM01) resonances at particular frequencies. The presence of a resonance within an operating frequency range of a waveguide device (e.g. either the uplink and or downlink frequency bands of a satellite antenna) causes high insertion loss and is generally unacceptable. The inner and outer diameters d1, d2 of the annular recess 650, the depth t2 of the annular recess 650, and the thickness t3 of the annular rib 660 provide degrees of freedom that can be used during the design of a waveguide circuit both to provide an impedance transition region between the empty waveguide and the window 640 and to tune the frequencies of any resonances to not fall within an operating frequency range of the waveguide circuit.

The waveguide window/seal 610 may be fabricated from a dimensionally stable, low-loss dielectric material suitable for use in an outdoor environment. The waveguide window seal 610 may be fabricated, for example, from a cross-linked polystyrene plastic material, such as REXOLITE® available from C-Lec Plastics. The waveguide window seal 610 may be fabricated from another low-loss dielectric material.

Figure 7:
FIG. 7 is a plan view and cross-sectional view of another waveguide window.
Figure 7:
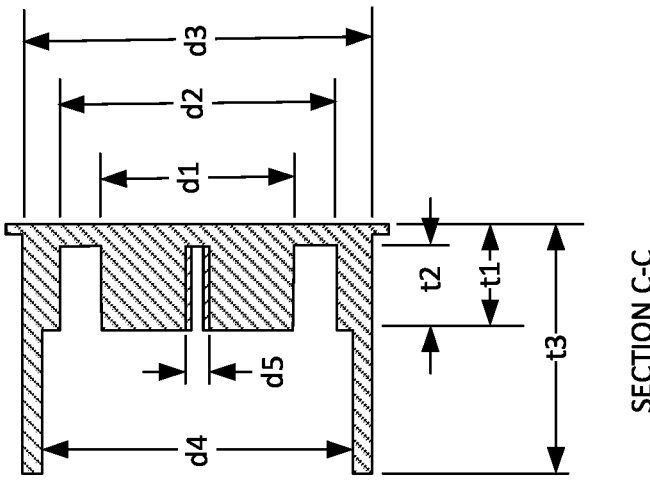
Figure 7:
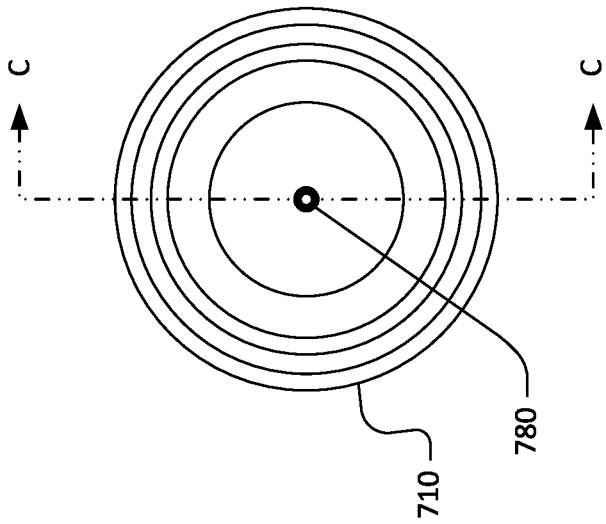

FIG. 7 shows a plan view and a cross-sectional view of another mechanically robust waveguide window/seal 710. The window/seal 710 differs from the window/seal 610 in that an inside diameter d4 of the annular rib is greater than an outside diameter d2 of the annular recess. Additionally, the window/seal 710 includes a center conductor 780, which may be a hollow tube of aluminum or other conductive metal.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A satellite ground station antenna, comprising:
a hub comprising:
    a first connecting member body,
    a first circular waveguide extending through the hub coaxial with the first connecting member body and terminating at a first port at an end face of the first connecting member body,
    a first window/seal to seal the first port, and
    two or more pins extending radially from the first connecting member body; and
a front-side feed network comprising:
    a second connecting member body comprising a cavity configured to fit over the first connecting member body, and two or more slots disposed around a perimeter of the cavity, each of the two or more slots configured to accept one of the two or more pins extending from the first connecting member body,
    a second circular waveguide coaxial with the cavity and terminating at a second port within the cavity,
    a second window/seal to seal the second port,
    a cap configured to fit over the second connecting member body, the cap including two or more L-shaped slots, each L-shaped slot to engage one of the two or more pins extending from the first connecting member body through the slots of the second connecting member; and
    a wave spring between an inside surface of the cap and a shoulder of the second connecting member body, the spring effective to urge the second port towards the first port when the two or more L-shaped slots of the cap are engaged with the two or more pins,
wherein the first and second window/seals each comprise:
    a right-circular cylindrical window having an axis;
    an annular rib surrounding and coaxial with the cylindrical window, an outer diameter of the annular rib configured to fit closely within an inside diameter of the respective circular waveguide; and
    an annular recess between the cylindrical window and the annular rib.

2. The antenna of claim 1, wherein, for the first and second window/seals:
    t1 is a length of the cylindrical window parallel to the axis,
    t2 is a depth, parallel to the axis, of the annular recess,
    t3 is a length, parallel to the axis of the annular rib, and
    $t2 < t1 < t3$.

3. The antenna of claim 1, wherein
    t1 is one-quarter wavelength at a frequency of operation.

4. The antenna of claim 1, each of the first and second window/seals further comprising:
    a flange to locate the window/seal with respect to the respective circular waveguide.

5. The antenna of claim 1, each of the first and second window/seals further comprising:
    a center conductor coaxial with the cylindrical window.

6. The antenna of claim 1, wherein
    for each of the first and second window/seals, the cylindrical window and the annular rib comprise a dimensionally stable, low loss dielectric material suitable for outdoor use.

7. The antenna of claim 1, wherein
    for each of the first and second window/seals, the cylindrical window and the annular rib comprise a cross-linked polystyrene plastic material.

8. The antenna of claim 1, wherein
    for each of the first and second window/seals, inner and outer diameters of the annular recess, a depth of the annular recess, and a length of the annular rib are configured to provide an impedance transition region between the cylindrical waveguide and the cylindrical window.

9. The antenna of claim 1, wherein
    for each of the first and second window/seals, inner and outer diameters of the annular recess, a depth of the annular recess, and a length of the annular rib are configured to tune frequencies of one or more resonances to not fall within an operating frequency range of a waveguide circuit comprising the cylindrical waveguide and the window/seal.

10. The antenna of claim 1, wherein
    when the two or more L-shaped slots of the cap are engaged with the two or more pins, the first circular waveguide window/seal and the second circular waveguide window/seal are separated by a gap forming a radial waveguide, the radial waveguide terminated in a conductive seal and one or more choke grooves.

* * * * *